Oct. 25, 1960   J. D. RUSSELL   2,957,570
MOBILE LOADING MACHINE
Original Filed Jan. 20, 1956   4 Sheets-Sheet 1
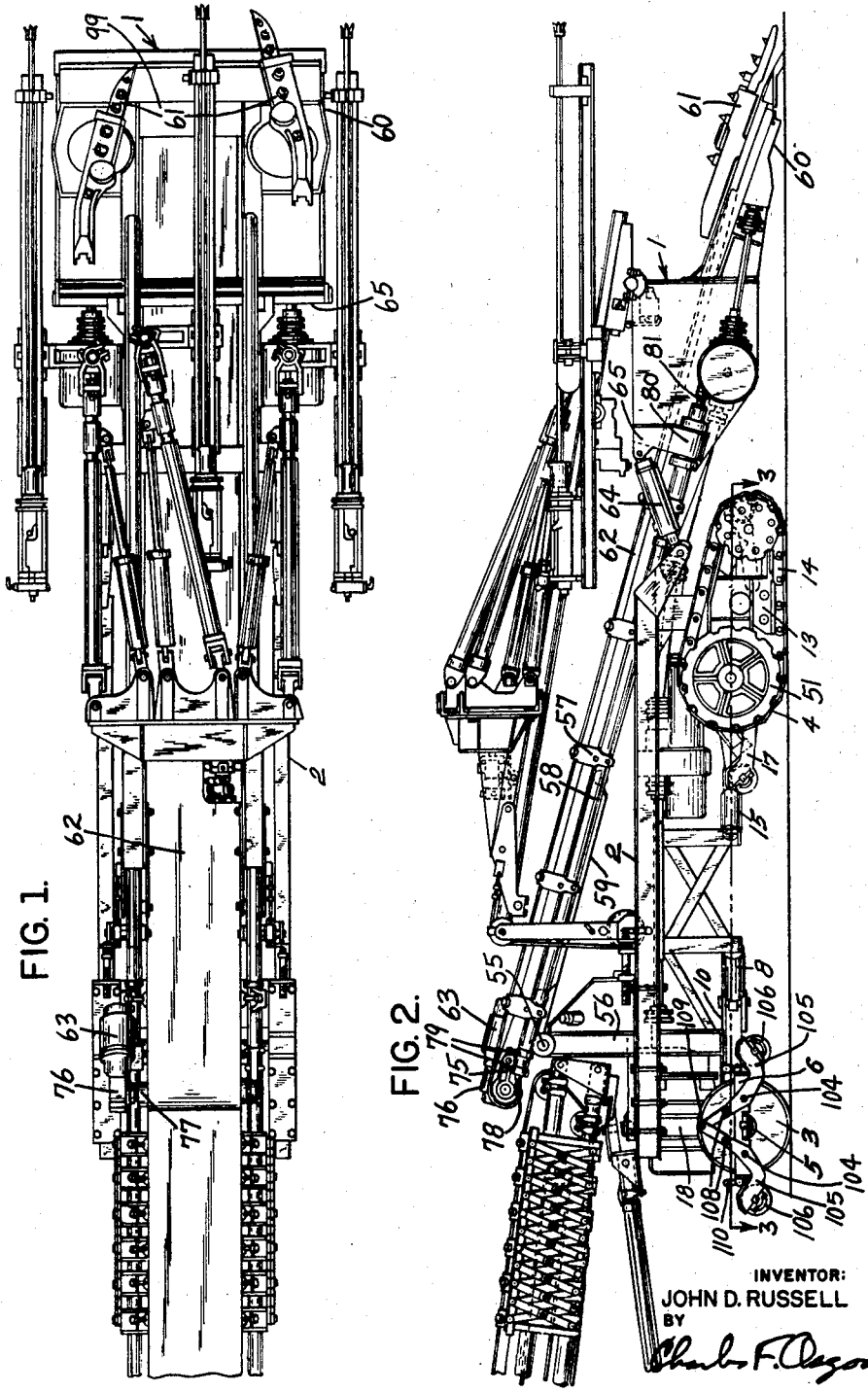
INVENTOR:
JOHN D. RUSSELL
BY
Charles F. Osgood
ATTORNEY

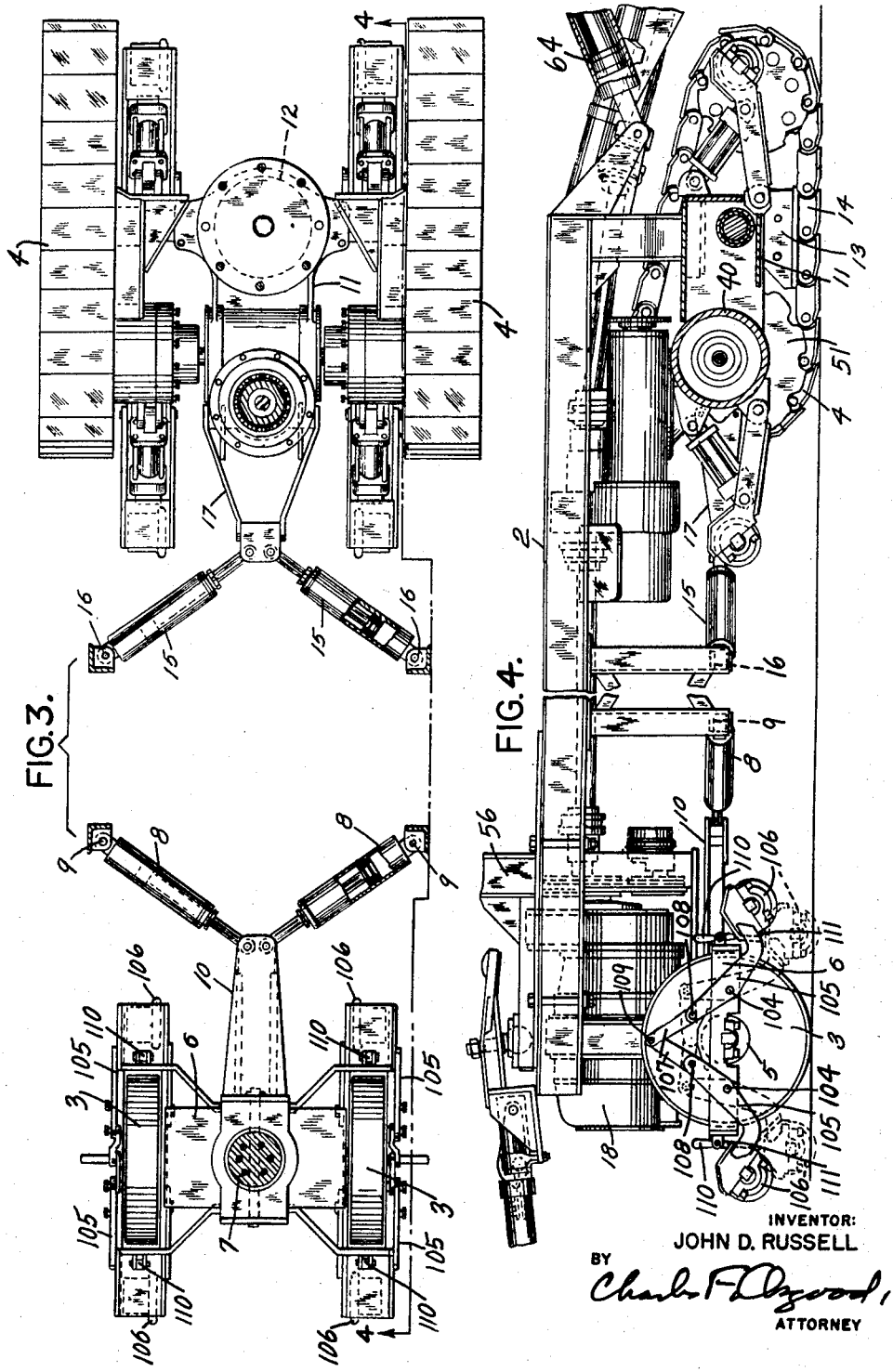

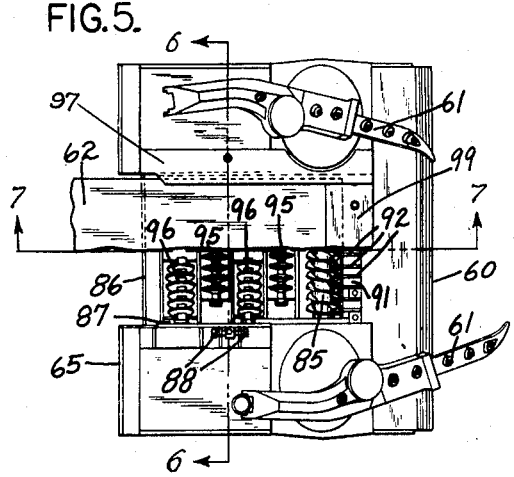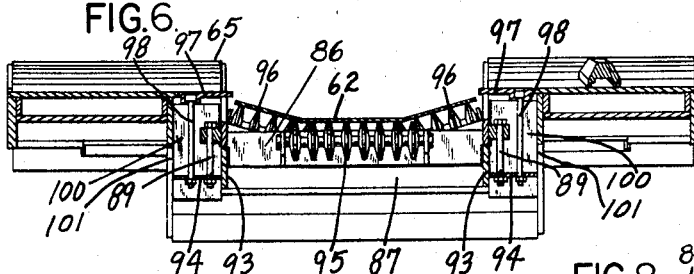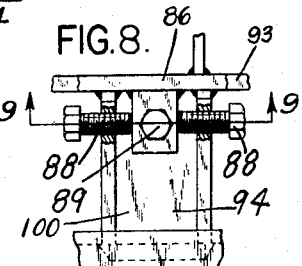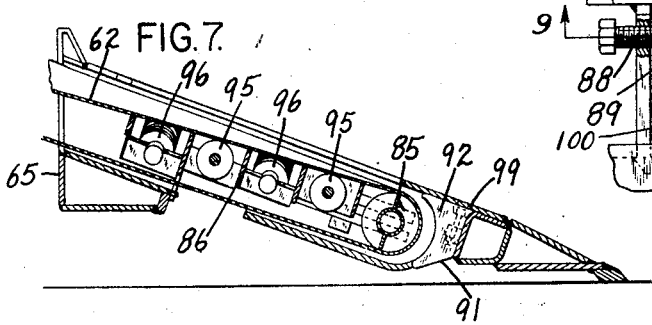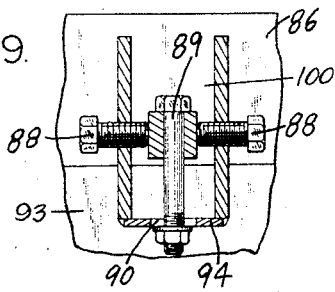
INVENTOR:
JOHN D. RUSSELL
BY Charles F. Osgood
ATTORNEY Oct. 25, 1960 J. D. RUSSELL 2,957,570
MOBILE LOADING MACHINE
Original Filed Jan. 20, 1956 4 Sheets-Sheet 4
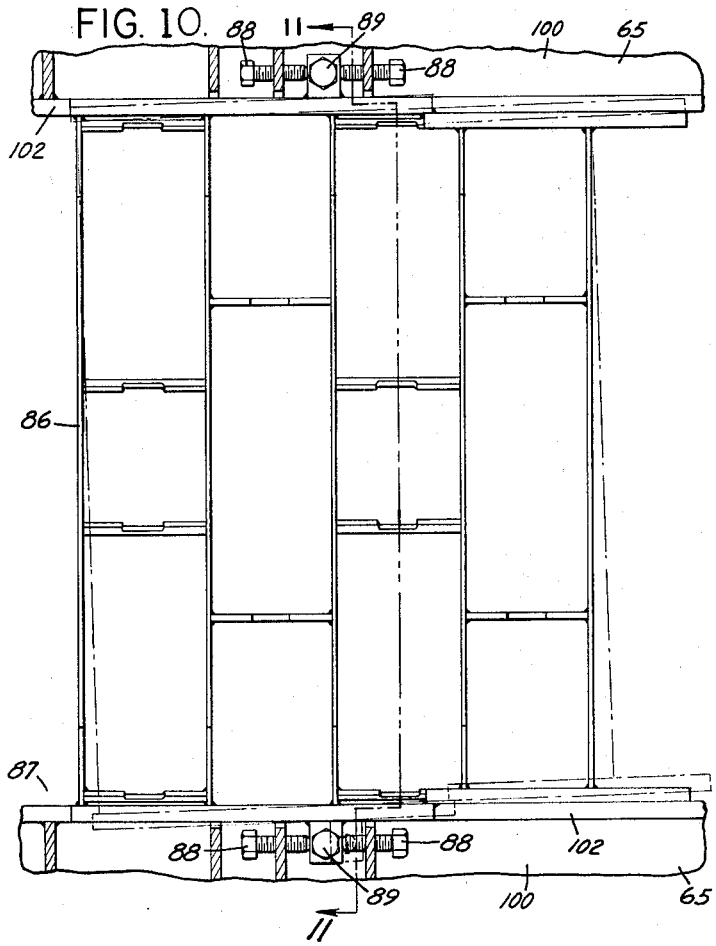
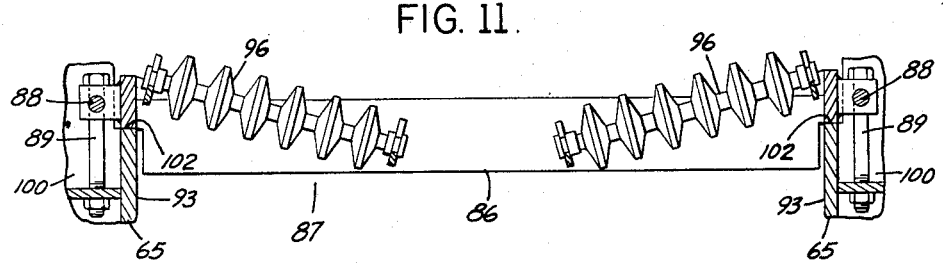
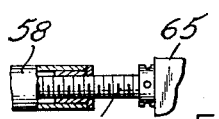
INVENTOR:
JOHN D. RUSSELL
BY Charles F. Osgood
ATTORNEY United States Patent Office 2,957,570
Patented Oct. 25, 1960

2,957,570

MOBILE LOADING MACHINE

John D. Russell, Bradfordwoods, Pa., assignor to Joy Manufacturing Company, Pittsburgh, Pa., a corporation of Pennsylvania Original application Jan. 20, 1956, Ser. No. 560,458, now Patent No. 2,907,481, dated Oct. 6, 1959. Divided and this application Dec. 10, 1956, Ser. No. 627,408

5 Claims. (Cl. 198—123)

This invention relates to loading apparatus and more particularly to a mobile loading machine especially designed for use in tunnel work.

This application is a division of my copending application Serial No. 560,458, filed January 20, 1956, now Patent No. 2,907,481.

An object of this invention is to provide an improved loading apparatus. Another object is to provide an improved mobile loading machine especially designed for use in tunnel work. Still another object is to provide an improved mobile loading machine of the endless belt type having an improved pulley and idler arrangement for guiding the conveyor belt. A further object is to provide an improved loading machine having improved gathering and conveying means. Yet another object is to provide an improved adjustable idler carrying frame for aligning the front belt guiding pulley relative to the rear pulley. These and other objects and advantages of the invention will, however, hereinafter more fully appear.

In the accompanying drawings there is shown for purposes of illustration one form which the invention may assume in practice.

In these drawings:

Fig. 1 is a plan view of the improved loading apparatus.

Fig. 2 is a side elevational view of the apparatus shown in Fig. 1.

Fig. 3 is an enlarged horizontal section taken on line 3—3 of Fig. 2, with parts shown in full.

Fig. 4 is a longitudinal vertical section, with parts shown in full, taken on line 4—4 of Fig. 3, and showing the loading machine traveling over the floor or ground.

Fig. 5 is a detail plan view of the front gathering head of the loading machine, with parts broken away to illustrate details of the front conveyor structure.

Fig. 6 is an enlarged cross sectional view taken on line 6—6 of Fig. 5.

Fig. 7 is an enlarged central longitudinal vertical section taken on line 7—7 of Fig. 5.

Fig. 8 is an enlarged detail view showing a portion of the adjusting means for the front conveyor-belt-pulley for varying the alignment of the latter with the belt.

Fig. 9 is a detail vertical section taken on line 9—9 of Fig. 8.

Fig. 10 is a fragmentary plan view of the loading head frame showing the adjustable front pulley frame, with the idler rolls removed and with parts in horizontal section.

Fig. 11 is a cross section taken on line 11—11 of Fig. 10.

Fig. 12 is a detail section through an adjusting screw for the head frame.

In this illustrative embodiment of the invention, as disclosed in the drawings, the improved loading apparatus is designed for association with tunneling apparatus adapted for use in accordance with an improved high speed drifting system as fully disclosed in the parent application. This loading apparatus is in the form of a mobile loading machine generally designated 1 having a main frame 2 mounted on rear, steel-rimmed, steering wheels 3 and on front crawler steering and traction devices 4. The wheels 3 are journaled on axles 5 carried by a frame 6 swivelled at 7 to turn about a vertical axis relative to the main machine frame 2. Oppositely acting fluid cylinders 8 are pivotally connected to the main frame at 9 and to a forward projection 10 (Fig. 3) of the swivelled frame 6, for turning the steering wheels 3 horizontally in either direction. The front crawler tread devices 4 comprise a frame 11 swivelled at 12 (Fig. 3) to turn about a vertical axis relative to the main frame, and tread side frames 13 secured to the swivelled frame 11 provide guideways for endless crawler tread chains 14. Oppositely acting fluid cylinders 15 (Fig. 3) are pivotally connected to the main frame at 16 and to a rearward projection 17 secured to the swivelled frame 11 for turning the crawler tread devcies in either of opposite directions.

The crawler tread chains 14 may be driven in unison by a motor 18 mounted on the main frame 2 above the swivel 7 for the main steering wheels as, shown at the left in Fig. 4.

Pivotally mounted at 55 on an upstanding frame structure 56 carried by the rearward portion of the main frame 2, as shown in Fig. 2, to tilt in vertical planes is an inclined conveyor frame 57 which comprises parallel tubular side members or side bars 58 rigidly connected in spaced parallel relation by cross members 59. Carried at the forward, lower portion of this tiltable conveyor frame is a gathering and loading head 60 having mounted thereon conventional oscillatory gathering arms 61 movable in out-of-step relation for gathering loose material or muck from the tunnel floor and for moving the same rearwardly and upwardly onto an endless belt conveyor 62 guided for orbital circulation relative to the tiltable frame 57 by conventional guide pulleys or rollers. This conveyor belt is driven by a motor 63 at its upper rear discharge end in a well-known manner. Fluid cylinders 64 are pivotally connected to the main frame and to the loading head frame 65 for tilting the frame 57 together with the loading head in vertical planes about the pivot 55 to vary the elevation of the loading head with respect to the tunnel floor or ground, and by trapping fluid in these cylinders the tiltable frame and loading head may be rigidly held in adjusted positions.

The gathering arms 61 may be driven by the motor 18 through means well known in the art, reference being made to my copending application, Serial No. 560,458, filed January 20, 1956.

The driving motor 63 for the conveyor belt 62 is mounted on an adjustable frame 75 and is connected through a conventional speed reducer 76 to a transverse drive pulley 77 about which the conveyor belt passes and by which the belt is driven. Adjusting screws 78 coaxial with the side bars 58 and connected between the latter and the frame 75 may be turned to adjust the frame 75 slightly angularly relative to the side bars to vary the location of the pulley or roller axis thereby properly to align the pulley or roller with the belt. Suitable clamps 79 may be tightened to secure the frame 75 firmly in adjusted position. The front head frame 65 is slidably mounted by side brackets 80 on the forward ends of the side bars 58 (see Fig. 2) and jack screws 81 coaxial with the side bars and threadedly connected between the latter and the head frame 65 may be turned to adjust the head frame longitudinally along the side bars to vary the tension of the conveyor belt. As shown in Fig. 12 screw 81 is rotatably secured in head frame 65 while being threadedly engaged with the side bars 58. Rotation of screw 81 will cause its longitudinal feed relative to side bars 58 and would simultaneously move head frame 65 along with it for adjustment purposes.

Now referring to Figs. 8 to 12 inclusive, it will be noted that the conveyor belt 62 passes around a transverse front idler pulley or roller 85 which is suitably formed with opposite spirals, in a well-known manner, for self-cleaning purposes. This front pulley is journaled on a frame section or pulley support 86 which is adjustably mounted within a rectangular recess 87 formed within the upper portion of the head frame 65 and this frame section has pairs of adjusting screws 88 at its opposite sides (Figs. 8 and 11) which are adjustable to move the frame section 86 angularly laterally and longitudinally in the recess in planes parallel with the bottom of the recess so as to align the front pulley or roller with respect to the belt. Vertical bolts 89 at each side of the frame section 86 pass through longitudinal slots 90 in the head frame and these bolts when tightened clamp the frame section 86 firmly in adjusted position. A toothed deflector or so-called grizzly 91 has a transverse row of vertical teeth 92 and is carried by the head frame with its teeth lying in adjacency to the pulley at the front side thereof for preventing large masses of material from moving down in front of the pulley while permitting any loose material to pass down between the deflector teeth. The adjustable frame section 86 lies loosely between the vertical sides 93 of the head frame 65 which provide the outer sidewalls of the recess (Fig. 9) and the slots 90 are formed in narrow plates 94 of the head frame, these plates extending outwardly from the outer sides of the adjustable frame section. The frame section 86 carries series of central horizontal guide rolls 95 and pairs of oppositely inclined side rolls 96 and these rolls cooperate with the upper run of the conveyor belt and serve to trough the belt as it passes rearwardly from the top of the front idler pulley or roller 85. The rolls 95 and 96 for the conveyor belt provide adequate support for the belt at the points where the belt receives the loose rock or muck discharged rearwardly by the gathering arms. Secured to the head frame and extending longitudinally along the sides of the chamber 87 in positions to overlie the outer edges of the conveyor belt are upper plates 97 which are detachably secured to the head frame by bolts 98, and a front cross plate 99 secured to the head frame overlies the front pulley 85 and the deflector 91 as shown in Fig. 10. Extending longitudinally within the head frame at the sides of the recess 87 are chambers 100 which may receive loose material discharged from the sides of the conveyor belt and rolls and these chambers open outwardly at 101 to permit discharge of such loose material downwardly from these chambers thereby to prevent clogging. The head frame 65 has upper surfaces 102 on which the side portions of the adjustable frame section or pulley support 86 rest, and the frame section 86 upon lateral angular adjustment, as indicated in broken lines in Fig. 13, moves over these upper frame surfaces. The frame section 86 may swing angularly about either bolt 89 and may not only be adjusted laterally but also longitudinally relative to the head frame. The idler rolls are suitably journaled in bearings supported by brackets on the adjustable frame section and the idler roll supports may be similar to those disclosed in Patent No. 2,622,447, assigned to the assignee of the present invention.

The loading machine 1 is adapted to travel along the rails of a main tunnel trackway during transport of the machine from place to place, and at that time the machine may be propelled by a conventional locomotive. The rear steering wheels 3 and the front crawler devices 4 may be run up onto the trackway and track-engaging wheels are associated therewith to guide and partially support the machine during its movement along the trackway. As shown in Figs. 2 and 4, pivotally mounted at 104 on horizontal transverse axes at the sides of the swivelled frame 6 to swing in vertical planes are levers 105 which carry small flanged track engaging wheels 106 at their remote ends. Toggle links 107 are pivotally connected at 108 to the upper adjacent ends of these levers and these links are pivotally connected together at 109. Releasable latches 110 on the front and rear sides of the frame 6 are engageable at 111 with the levers 105 for holding the track engaging wheels in raised inoperative position, as shown in full lines in Fig. 4. When the latches are released the wheels 106 may drop down into engagement with the track rails as shown in dotted lines in Fig. 4 and the toggle links 107 assume the position shown in dotted lines in Fig. 4 with the pivot 109 below a horizontal plane including the pivots 108 thereby rigidly to lock the levers in lowered position as shown.

As a result of this invention an improved loading apparatus is provided especially designed for use in tunnel work whereby the muck at the tunnel face may be efficiently loaded out. The auxiliary wheel arrangement for the loading machine provides travel either along the tunnel trackway or directly over the tunnel floor. By the provision of the improved adjustable mountings for the pulleys for the conveyor belt the pulleys may be readily adjusted into proper alignment with the belt and firmly held in adjusted positions. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A conveyor mechanism comprising, elongated parallel forwardly and downwardly inclined side members, a transverse frame extending between the upper ends of said side members, a head frame mounted on the forward lower portions of said side members, adjusting means to adjust said head frame relative to said side members, an adjustable frame carried by said head frame, rollers carried by said side members and said adjustable frame, respectively, an endless conveyor belt extending longitudinally between said side members and passing around said rollers and devices for adjusting said adjustable frame relative to said head frame to align the rollers on said adjustable frame.

2. A conveyor mechanism as set forth in claim 1 wherein said adjusting devices are provided between said adjustable frame and said head frame for adjusting the adjustable frame longitudinally along said side members to vary the tension of said belt.

3. A conveyor mechanism as set forth in claim 1 wherein said head frame has a generally rectangular recess provided with a plane bottom and an open top and said adjustable frame is generally rectangular and is received in said recess and is adjustable in said recess in planes parallel with the recess-bottom.

4. A conveyor mechanism as set forth in claim 1 wherein adjusting means are located between said side members and said roller located on said side members to thereby vary the location of said last mentioned roller and wherein said devices for adjusting said adjustable frame are located between said head frame and said adjustable frame to adjust the latter with respect to said head frame.

5. In a conveying mechanism, a supporting frame, an upstanding support on said frame, a conveyor frame inclined forwardly on said supporting frame, said conveyor frame being pivotally supported at the rearward end thereof on said upstanding support whereby said conveyor frame may tilt in a vertical plane relative to said supporting frame, a head frame carried by said forward end of said conveyor frame, means for adjusting said head frame relative to said conveyor frame, means interconnecting said supporting frame and said head frame, an adjustable frame carried by said head frame, means to adjust said adjustable frame relative to said head frame, belt supporting means located on said adjustable frame and on said rearward end of said conveyor frame.

References Cited in the file of this patent

UNITED STATES PATENTS

| | | |
|---|---|---|
| 940,999 | Whaley | Nov. 23, 1909 |
| 1,581,435 | Flowers | Apr. 20, 1926 |
| 1,595,420 | Robb | Aug. 10, 1926 |
| 1,626,041 | Kyle | Apr. 26, 1927 |
| 1,875,783 | Vodoz | Sept. 6, 1932 |
| 1,884,671 | Hauge | Oct. 25, 1932 |
| 2,392,697 | Russell | Jan. 8, 1946 |
| 2,619,222 | Przybylski | Nov. 25, 1952 |
| 2,622,447 | Murphy | Dec. 23, 1952 |
| 2,638,200 | Russell | May 12, 1953 |
| 2,725,757 | Murphy | Dec. 6, 1955 |